United States Patent
Wolf

(10) Patent No.: US 7,335,998 B2
(45) Date of Patent: Feb. 26, 2008

(54) DEVICE FOR SUPPLYING VOLTAGE TO THE LOADS OF AN ONBOARD ELECTRICAL SYSTEM OF A MOTOR VEHICLE, USING A PLURALITY OF GENERATORS

(75) Inventor: Gert Wolf, Affalterbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/357,318

(22) Filed: Feb. 17, 2006

(65) Prior Publication Data

US 2006/0208491 A1 Sep. 21, 2006

(30) Foreign Application Priority Data

Mar. 17, 2005 (DE) .................. 10 2005 012 273

(51) Int. Cl.
*H02J 4/00* (2006.01)
(52) U.S. Cl. ....................................................... 290/10
(58) Field of Classification Search .................. 290/10
See application file for complete search history.

(56) References Cited

U.S. PATENT DOCUMENTS

| | | | | | |
|---|---|---|---|---|---|
| 1,723,284 | A | * | 8/1929 | Livingston | .................. 290/17 |
| 1,777,768 | A | * | 10/1930 | Reid | ........................ 220/302 |
| 3,294,976 | A | | 12/1966 | Tipton et al. | |
| 3,585,473 | A | * | 6/1971 | Huxtable et al. | ............ 318/140 |
| 4,177,414 | A | * | 12/1979 | Roesel et al. | ................... 322/28 |
| 4,340,880 | A | * | 7/1982 | Baumann et al. | ............ 375/259 |
| 4,347,473 | A | * | 8/1982 | Stroud | ......................... 320/126 |
| 4,604,565 | A | | 8/1986 | Yokota et al. | |
| 4,728,806 | A | * | 3/1988 | Baker et al. | .................... 307/43 |
| 4,757,249 | A | * | 7/1988 | Farber et al. | ................ 320/126 |
| 4,839,228 | A | * | 6/1989 | Jezic et al. | .................. 428/401 |
| 5,233,229 | A | * | 8/1993 | Kohl et al. | ................. 307/10.1 |
| 5,254,936 | A | * | 10/1993 | Leaf et al. | ..................... 322/90 |
| 5,723,972 | A | * | 3/1998 | Bartol et al. | ................... 322/15 |
| 7,019,495 | B2 | * | 3/2006 | Patterson | ........................ 322/7 |
| 2001/0024107 | A1 | | 9/2001 | Jabaji | |

FOREIGN PATENT DOCUMENTS

| | | | |
|---|---|---|---|
| DE | 41 08 86 | | 10/1992 |
| EP | 569279 | A1 * | 11/1993 |
| JP | 03183331 | A * | 8/1991 |
| JP | 04038131 | A * | 2/1992 |
| SU | 957354 | A * | 9/1982 |
| SU | 1663477 | A1 * | 7/1991 |

* cited by examiner

*Primary Examiner*—Joseph Waks
(74) *Attorney, Agent, or Firm*—Kenyon & Kenyon LLP

(57) ABSTRACT

A device for supplying voltage to the loads of an onboard electrical system of a motor vehicle includes a first generator, a regulator allocated to the first generator, a second generator, a regulator allocated to the second generator, and a control apparatus. The control apparatus is connected to at least one, and possibly to both, of the regulators, and the control apparatus supplies these regulators with control signals on the basis of which the loading of the generators is compensated.

25 Claims, 1 Drawing Sheet

DEVICE FOR SUPPLYING VOLTAGE TO THE LOADS OF AN ONBOARD ELECTRICAL SYSTEM OF A MOTOR VEHICLE, USING A PLURALITY OF GENERATORS

FIELD OF THE INVENTION

The present invention relates to a device for supplying voltage to the loads of an onboard electrical system of a motor vehicle, using a plurality of generators.

BACKGROUND INFORMATION

It is known in the art to connect two generators in parallel to a voltage supply of the loads of a motor vehicle electrical system. Such a device for voltage supply in a motor vehicle having generators connected in parallel is described in published German patent document DE 41 08 861. In this known device, a voltage regulator is allocated to each of the generators. In addition, the known device has at least one battery of which one terminal can be connected to the voltage regulator via an ignition switch. In addition, a charge control device is provided that is connected to the ignition switch and to the voltage regulators, and that can be connected to the negative terminal of the battery, which is preferably at ground, via a switching device. Between the charge control device, the voltage regulators, and the cited switching device, there is situated a circuit system having a plurality of components that are conductive in one direction and that block in another direction. This known device is intended to achieve the result that through the use of two generators a high degree of electrical power can be produced, and that, using a single indicator, for example a charge control lamp, errors that occur in one of the two generator-voltage regulator systems can be indicated, whereupon the other generator-voltage regulator system can continue to operate without problems.

SUMMARY OF THE INVENTION

A device for supplying voltage in accordance with the present invention has the advantage that the load placed on the generators can be set individually. In particular, the load on the generators can be influenced such that all generators of the device are equally loaded, i.e., operated with approximately the same portion of their respective maximum power. This prolongs the life span of the generators and also of the overall device, because if one of the generators were to fail, the device as a whole would likewise no longer be functional.

According to an example embodiment, the control apparatus of the device generates control signals through which various control speeds or time constants are predetermined for the regulators. This measure increases the stability of the voltage supply.

Another advantageous example embodiment of a device according to the present invention provides the allocation of a master function to one of the generators and a slave function to the other generator or generators. The master function is assigned to the generator having the highest transformation ratio of exciter current to generator current. In this way, this generator can rapidly compensate all changes in load. All the other generators of the electrical system are treated as slaves by the control apparatus. For these additional generators, high load-response times are preferably set, so that the additional generators initially do not react to changes in load; i.e., they react with a delay. The control apparatus can, for example, predetermine, via a bit-synchronous interface, a new exciter current target value or an exciter voltage target value for the respective regulator that can be approached by temporal ramping. The respective target value is determined using information concerning the load jump of the generator performing the master function and the available power reserves in the generators performing the slave function. At any time, as needed, the control apparatus can modify the master-slave assignments named above, and can assign the master function to one of the generators that previously performed the slave function. In addition, the control device can ensure a minimum load on each generator by a suitable predetermination of the loading of the generators performing the slave function.

The generators may belong to different parts of the onboard electrical system, and are connected to one another, or can be connected to one another, via a coupling element. If an error occurs, for example, in one part of the electrical system, the generator in the subsystem that is not affected can continue to operate alone. In this case, the control apparatus for the generator controller of the subsystem that is not affected can produce control signals corresponding to voltage predetermination, and not load predeterminations, as in the case of a parallel operation of a plurality of generators.

If, in the previous parallel operation, the slave function was not assigned to the generator of the subsystem not affected by the error, then after the occurrence of the named error this generator is again assigned a high regulating speed, so that it can quickly regulate out changes that occur in the output voltage of the generator.

The supply of power to the control apparatus preferably takes place from the onboard electrical system, or, given the presence of a plurality of onboard electrical subsystems, from at least one of the subsystems, e.g., using one or more diodes.

DETAILED DESCRIPTION

Figure 1:
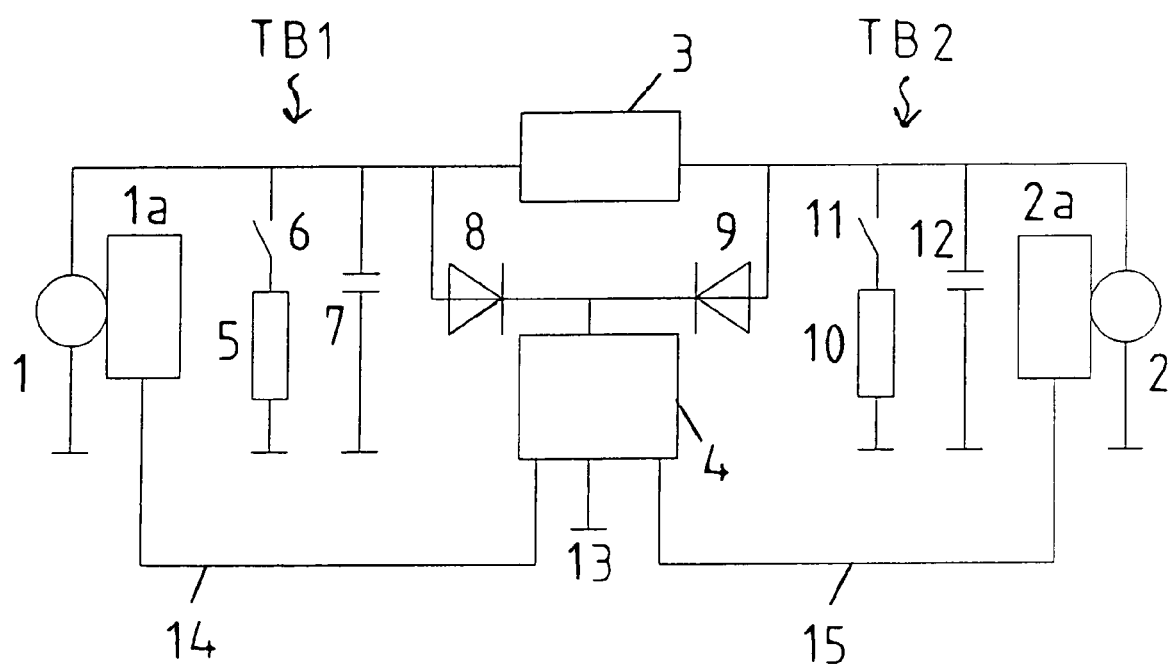
FIG. 1 shows a block diagram of an example embodiment of a device for supplying voltage to the load of an electrical system of a motor vehicle.

The device shown in FIG. 1 has an onboard electrical system made up of subsystems TB1 and TB2. Subsystems TB1 and TB2 are connected to one another, or can be connected to one another, via a coupling element 3. According to a first exemplary embodiment, this coupling element 3 is a fuse. Coupling element 3 is not absolutely necessary. In order to exploit the advantages of the present invention, a simple connection of the two parts of the electrical system is sufficient.

In the first subsystem TB1, a first generator 1 is provided to which a first regulator 1a is allocated. The output voltage of generator 1 is used to supply voltage to the loads of the electrical system, in particular the loads 5 of the first electrical system, which are connected to generator 1 via a switch 6. A storage capacitor 7 is provided parallel to the series circuit made up of switch 6 and loads 5. The regulation of generator 1 takes place using control signals that are generated in a control apparatus 4 and are supplied to regulator 1a, allocated to generator 1, via a first control line 14. Control apparatus 4 is connected to ground 13.

In the second onboard electrical subsystem TB2, a second generator 2 is provided to which a second regulator 2a is allocated. The output voltage of generator 2 is used to supply voltage to the loads of the electrical system, in particular loads 10 of second electrical subsystem TB2, which are connected to generator 2 via a switch 11. A storage capacitor 12 is provided parallel to the series circuit made up of switch 11 and loads 10. The regulation of generator 2 takes place through control signals that are generated in control apparatus 4 and that are supplied to controller 2a, allocated to generator 2, via a control line 15.

The supply of energy to control apparatus 4 takes place from the onboard electrical system. For this purpose, control apparatus 4 is connected to onboard electrical subsystem TB1 via a diode 8, and to onboard electrical subsystem TB2 via a diode 9.

In the above-described device, various output voltages of generators 1 and 2 can arise during operation, determined by the wiring of the onboard electrical system, which means the loads on generators 1 and 2 may also vary.

In order to avoid such a different loading of the generators, control device 4 is connected to at least one, and possibly both, regulators 1a and 2a, in order to supply to these regulators control signals that modify the load of the respective generator so that the loading of the generators is uniform. In this way, it is advantageously achieved that the life span of the generators, and thus of the device as a whole, is increased.

Advantageously, control apparatus 4 assigns the master function to one of the two generators. As an example, the master function is given to the generator having the largest transformation ratio of exciter current to generator current. This generator is assigned a high regulating speed, i.e., a small regulating time constant, on the basis of which the generator is able to quickly compensate all changes in load that occur.

Control apparatus 4 assigns the slave function to the other generator. A small regulating speed, i.e., a large regulating time constant or a high load-response time, is allocated to this generator. This has the consequence that this generator reacts to changes in load with a delay.

This setting of different time constants in the two control circuits increases the stability of the supply of voltage to the loads, because the two control circuits do not influence one another.

The transmission of the control signals, which contain information concerning a load-determining quantity of the respective generator, via control lines 14 and 15 may take place via the bit-synchronous interface (BSS interface) of the respective regulator. In this context, a new exciter current target value or exciter voltage target value is predetermined that is approached using suitable temporal ramping. In the calculation of the named target values, control apparatus 4 uses, in particular, information about the load jump of the generator performing the master function, as well as information concerning the power reserves available to the generator performing the slave function. In addition, in determining the named target values, control apparatus 4 ensures that the loading of the slave generator does not fall below a predetermined minimum load. In operation, when this predetermined minimum value is reached, an error message may be outputted in order to signal that the two generators are no longer electrically connected.

In order to avoid damage due to excess voltage, the respective associated regulator is set such that it limits the output voltage of the respective generator to a predetermined maximum value. In this way, the life span of the respective generator, and thus of the device as a whole, is further increased. Preferably, when the predetermined maximum value is reached an error message is outputted indicating that the two generators are no longer electrically connected.

In normal operation, in the above-described exemplary embodiment the two onboard electrical subsystems TB1 and TB2, and also the two generators 1 and 2, are connected to one another via fuse 3.

If, in case of a fault, the named fuse is triggered, the two onboard electrical subsystems are separated from one another. In this case, generators 1 and 2 are provided exclusively for supplying the loads of the respective electrical subsystem TB1 or TB2. For this purpose, the control apparatus no longer transmits via the respective control line 14 or 15 (as in a parallel operation of the two generators) load-determining control signals to the generator regulators; rather, control signals containing voltage predeterminations are transmitted. The voltage predeterminations to generator regulators 1a and 2a can contain different target voltage values. In addition, control apparatus 4 again modifies the regulating time constant of the generator performing the slave function in parallel operation so that a low regulating time constant is allocated to this generator. In this way, this generator is made capable of quickly compensating the fluctuations that occur in the associated electrical subsystem.

In the above-described exemplary embodiment, coupling element 3 is a fuse. Alternatively, coupling element 3 can also be a high-ohmic resistor, a DC-DC converter, or a switch.

Alternatively to the above-described exemplary embodiments, a device according to the present invention can also have more than two generators. In this case, it is possible for one of the generators to be assigned the master function while all other generators are assigned the slave function.

The acquisition of the load states of the generators may take place via an evaluation of the clock signal of the regulator final stage, or of a signal derived therefrom. Alternatively, the acquisition of the load states takes place via an evaluation of the exciter current of at least one generator, or of a quantity derived therefrom. Another alternative is that the acquisition of the load states takes place through an evaluation of the generator output current, or of a quantity derived therefrom. In addition, it is possible to carry out the acquisition of the load states via an evaluation of the exciter voltage, or of a quantity derived therefrom.

In an example embodiment of the present invention, at least one of the regulators determines the load state of the associated generator, and this load state is used to calculate the target load state of the other generator.

Control apparatus 4 may form one structural unit with at least one of the voltage regulators.

What is claimed is:

1. A device for supplying voltage to loads of a motor vehicle electrical system, comprising:
    a first generator;
    a first voltage regulator allocated to the first generator;
    a second generator;
    a second voltage regulator allocated to the second generator; and
    a control apparatus connected to at least one of the first and second voltage regulators, wherein the control apparatus supplies a control signal to the at least one of the first and second voltage regulators, and wherein the at least one of the first and second voltage regulators modifies a loading of an associated generator, depending on the control signal,
    wherein the control apparatus predetermines two different regulating speeds for the first and second voltage regulators.

2. The device as recited in claim 1, wherein the control signal contains information concerning a load-determining quantity of the at least one of the first and second voltage regulators.

3. The device as recited in claim 2, wherein a degree of loading for a selected generator is ascertained by one of: a) evaluation of a clock signal of an associated voltage regulator; and b) evaluation of a signal derived from the clock signal of the associated voltage regulator.

4. The device as recited in claim 2, wherein a degree of loading for a selected generator is ascertained by one of: a) evaluation of an exciter current of the selected generator; and b) evaluation of a quantity derived from the exciter current of the selected generator.

5. The device as recited in claim 2, wherein a degree of loading for a selected generator is ascertained by one of: a) evaluation of an output current of the selected generator; and b) evaluation of a quantity derived from the output current of the selected generator.

6. The device as recited in claim 2, wherein a degree of loading for a selected generator is ascertained by one of: a) evaluation of an exciter voltage of the selected generator; and b) evaluation of a quantity derived from the exciter voltage of the selected generator.

7. The device as recited in claim 3, wherein the first and second generators are equally loaded.

8. The device as recited in claim 2, wherein the control apparatus is connected to both the first and second voltage regulators, and wherein a first control signal is supplied to the first voltage regulator and a second controls signal is supplied to the second voltage regulator, whereby the first voltage regulator modifies the loading of the first generator dependent on the first control signal and the second voltage regulator modifies the loading of the second generator dependent on the second control signal so that both the first and second generators are equally loaded.

9. The device as recited in claim 2, wherein the control apparatus is connected to both the first and second voltage regulators, and wherein one of the first and second voltage regulators ascertains a load state of an associated generator, and wherein the ascertained load state is used to calculate a target load state of a generator associated with the other one of the first and second voltage regulators.

10. The device as recited in claim 9, wherein the first and second voltage regulators limit output voltages of the respective first and second generators to a predetermined maximum value.

11. The device as recited in claim 10, wherein an error message is output when the predetermined maximum value is reached.

12. The device as recited claim 9, wherein the first and second voltage regulators limit output voltages of the respective first and second generators to a predetermined minimum value, independent of the ascertained load state.

13. The device as recited in claim 12, wherein an error message is output when the predetermined minimum value is reached.

14. The device as recited in claim 2, wherein the control apparatus predetermines a regulating speed of at least one of the first and second voltage regulators.

15. The device as recited in claim 2, further comprising:
a third generator; and
a voltage regulator associated with the third generator;
wherein one of the first, second and third generators performs the master function and the remaining generators perform the slave function.

16. The device as recited in claim 2, wherein the control apparatus and at least one of the first and second voltage regulators form a single structural unit.

17. The device as recited in claim 1, wherein one of the first and second generators performs the master function and the other generator performs the slave function, and wherein the control apparatus predetermines a high regulating speed for the voltage regulator associated with the generator performing the master function, and wherein the control apparatus predetermines a low regulating speed for the voltage regulator associated with the generator performing the slave function.

18. The device as recited in claim 17, wherein the first and second generators belong to first and second electrical subsystems, and wherein the first and second generators are configured to be selectively coupled to one another via a coupling element.

19. The device as recited in claim 18, wherein the coupling element is one of a fuse, an ohmic resistor, a DC-DC converter, and a switch.

20. The device as recited in claim 18, wherein, when the first and second generators are decoupled from one another, the control apparatus supplies respective control signals to the first and second voltage regulators corresponding to predetermined voltages for the respective first and second generators.

21. The device as recited in claim 18, wherein, when the first and second generators are decoupled from one another, the control apparatus predetermines a high regulating speed for the voltage regulator associated with the generator performing the slave function.

22. The device as recited in claim 18, wherein, when the first and second generators are decoupled from one another, the control apparatus supplies to the first and second voltage regulators control signals that correspond to different target voltage values.

23. The device as recited in claim 18, wherein supply of voltage to the control apparatus takes place via a diode.

24. The device as recited in claim 23, wherein the control apparatus is connected to the first electrical subsystem via a first diode, and wherein the control apparatus is connected to the second electrical subsystem via a second diode.

25. A device for supplying voltage to loads of a motor vehicle electrical system, comprising:
a first generator;
a first voltage regulator allocated to the first generator;
a second generator;
a second voltage regulator allocated to the second generator; and
a control apparatus connected to the first and second voltage regulators, wherein the control apparatus supplies at least one control signal to the first and second voltage regulators, and wherein the first and second voltage regulators modify a loading of an associated generator, depending on the control signal,
wherein the control apparatus predetermines two different regulating speeds for the first and second voltage regulators.

* * * * *